(12) United States Patent
Lee et al.

(10) Patent No.: US 7,765,393 B1
(45) Date of Patent: Jul. 27, 2010

(54) METHOD AND SYSTEM OF EMBEDDING A BOOT LOADER AS SYSTEM FIRMWARE

(75) Inventors: Min Eig Lee, Palo Alto, CA (US); Chih-Yi Chen, San Jose, CA (US); Huynh Duc Mai, Milpitas, CA (US); Michael A. Sebrée, Mountain View, CA (US); Pradeep Kalra, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1050 days.

(21) Appl. No.: 11/484,979

(22) Filed: Jul. 11, 2006

(51) Int. Cl.
*G06F 9/00* (2006.01)
(52) U.S. Cl. ............................................. 713/2; 714/6
(58) Field of Classification Search ..................... 713/2; 714/6
See application file for complete search history.

(56) References Cited

U.S. PATENT DOCUMENTS 5,937,434 A * 8/1999 Hasbun et al. ............... 711/170
6,263,431 B1 * 7/2001 Lovelace et al. ................ 713/2

* cited by examiner

*Primary Examiner*—Albert Wang
(74) *Attorney, Agent, or Firm*—Blakely, Sokoloff, Taylor & Zafman LLP

(57) ABSTRACT

An IBM PC compatible processing system typically has a BIOS installed as system firmware. During a boot process of the processing system, the BIOS loads a boot loader from one of the boot media, i.e., hard drives, floppy disks, CDs, USB flash memories, taps, etc. and passes control of the boot loader, the boot loader then loads an OS from the boot media. The present invention takes advantage of the higher reliability and availability provided by the system flash memory and stores a boot loader as system firmware in the system flash memory. Further, it provides changes in the BIOS boot process to load the boot loader from system memory, the ROM, for example, without relying on boot media. With this new process, the boot loader can be loaded even when the boot media is corrupt, defective or un-initialized.

22 Claims, 6 Drawing Sheets

US 7,765,393 B1

METHOD AND SYSTEM OF EMBEDDING A BOOT LOADER AS SYSTEM FIRMWARE

FIELD OF THE INVENTION

At least one embodiment of the present invention pertains to processing systems, and more particularly, to the firmware of a processing system.

BACKGROUND

Typically, an IBM Personal Computer (PC) contains processing system has a Basic Input/Output System (BIOS) installed as firmware. Firmware is a software program that is embedded in a read-only storage device, i.e., a Read-Only Memory (ROM). The primary function of the BIOS is to prepare the processing system so that other software programs stored on various storage media (magnetic disks, optical disks such as compact disks or DVDs, tapes, etc.) can be loaded and executed, and assume control of the processing system. This process is known as booting up.

FIG. 1 is a high-level block diagram showing the architecture of a traditional IBM PC Compatible processing system. According to the depiction of FIG. 1, the processing system includes one or more processors 101 coupled to a bus system 104. The bus system 104 is an abstraction that represents any one or more physical buses and/or point-to-point connections. The processors 101 are the central processing units (CPUs) of the processing system and, thus control the overall operation of the processing system. A BIOS 111 is stored as firmware in a Read-Only Memory (ROM) 103, which is coupled to the bus system 104. Programmable Read-Only Memory (PROM) or Erasable Programmable Read-Only Memory (EPROM) has often been used to store BIOS because these forms of ROM are writable under certain conditions. Thus, the BIOS stored therein may be easily upgraded. A Random Access Memory (RAM) 102 is also coupled to the bus system 14. The function of the RAM 102 is to store program code and data during normal operation of the processing system, i.e., after boot up. Both the RAM 102 and ROM 103 are "system memories" directly accessible by the processor 101.

Also connected to the processors 101 through the bus system 104 are storage adapters 105 connecting to a group of external storage media such as hard drives 106, floppy disks 107, CDs 108, Universal Serial Bus (USB) flash memories 109, DVDs and/or tapes (not shown). These external storage media may also be called "boot media" because they may store Operating Systems (OSs) 113 and boot loaders (or bootstrap loaders) 112. A boot loader is a special small program, which does not have the full functionality of an OS, but is tailor-made to load the OS to start. Traditionally, a boot loader is customized for a particular OS, and is stored in boot media together with the OS. A boot loader may consist of several stages, the master boot record (MBR), the stage 1, the stage 2 and the loader. The MBR contains a partition table and may reside at the first sector of a disk. The stage 1 may start at the first sector of an active partition, and load the usage 1 which may occupy several sectors. Stage 2 brings in the final stage, the loader.

A storage adapter is one type of Input/Output control device. The term "external" is used in the present application to distinguish storage media such as hard drives, floppy disk, CDs, USB flash memories, DVDs and tapes from "system memory", e.g., the RAM 102 and "system flash memory", e.g., the ROM 103. The critical difference between an external storage media and the system memory (and system flash memory) is that a processor has to communicate with (read/write) the external storage media through the control of a storage adapter. By contrast, the processor can access (read or write) system memory and/or system flash memory directly without having to go through any I/O control device.

The term "load", "loads" or "loading" used in the present application refers to reading instructions and/or data from a source storage medium, including any external storage media and/or the ROM 103, into the RAM 102 so that the processors 101 may execute these instructions and access the data.

Also shown in FIG. 1 is a network adapter 110, which allows the processing system to communicate with remote devices. The network adapter 110 may be, for example, an Ethernet adapter or a Fibre Channel adapter.

FIG. 2 is a flow diagram illustrating a traditional boot process of the processing system shown in FIG. 1. Upon booting up, at block 201, the processors 101 run the instructions of the BIOS start-up program stored in ROM 103. This program runs a Power-On Self Test (POST) to check the devices of the processing system are functioning; it also initializes these devices. At block 202, the BIOS loads a boot loader 112 from one of the boot media, i.e., the hard drives 106, floppy disks 107, CDs 108, USB flash memories 109, DVDs, or tapes, and passes control to the boot loader 112. At block 203, the boot loader 112, being executed by the processors 101, loads an OS 113, normally the OS stored on the same medium as the boot loader, and passes control to the OS 113.

A drawback of the above approach is that the boot medium storing the boot loader may get corrupted or become defective, because a boot medium is usually writeable during the normal course of use/operation (as a result of mechanical or electrical disturbances, for example). If corruption or defect occurs, the BIOS is then unable to load a boot loader and the system stops very early during the boot process. At this stage, the processing system usually requires the boot medium to be fixed.

SUMMARY OF THE INVENTION

The present invention includes a processing system having a processor, a memory coupled to the processor and a Basic Input/Output System (BIOS) having instructions to be loaded into the memory for execution by the processor. The processing system further has a Read-Only Memory (ROM) directly accessible by the processor such that the processor does not have to communicate through any Input/Output control device to access the ROM. The ROM stores a boot loader as firmware for booting an Operating System (OS).

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A system and method for embedding a boot loader as system firmware is described. References in this specification to "an embodiment", "one embodiment" or the like, mean that the particular feature, structure or characteristic being described is included in at least one embodiment of the present invention. Occurrences of such phrases in this specification do not necessarily all refer to the same embodiment.

The present invention includes a technique to improve the reliability and speed of booting up a processing system, particularly an IBM PC compatible processing system. According to the technique introduced here, a boot loader is stored as firmware in a ROM of the processing system. The ROM is directly accessible by the processor(s) of the processing system such that the processor(s) does/do not need to communicate through any I/O control device to access the ROM. Because the ROM is usually directly installed on a motherboard of the processing system and is not writable in the normal course of use/operation of the processing system, data stored therein is less likely getting corrupted than if it were stored in the external storage media, i.e., hard drives, floppy disks, CDs, USB flash memories, DVDs, tapes, etc. Moreover, because the ROM is directly accessible by the processor(s), loading the boot loader is much faster.

Figure 1:
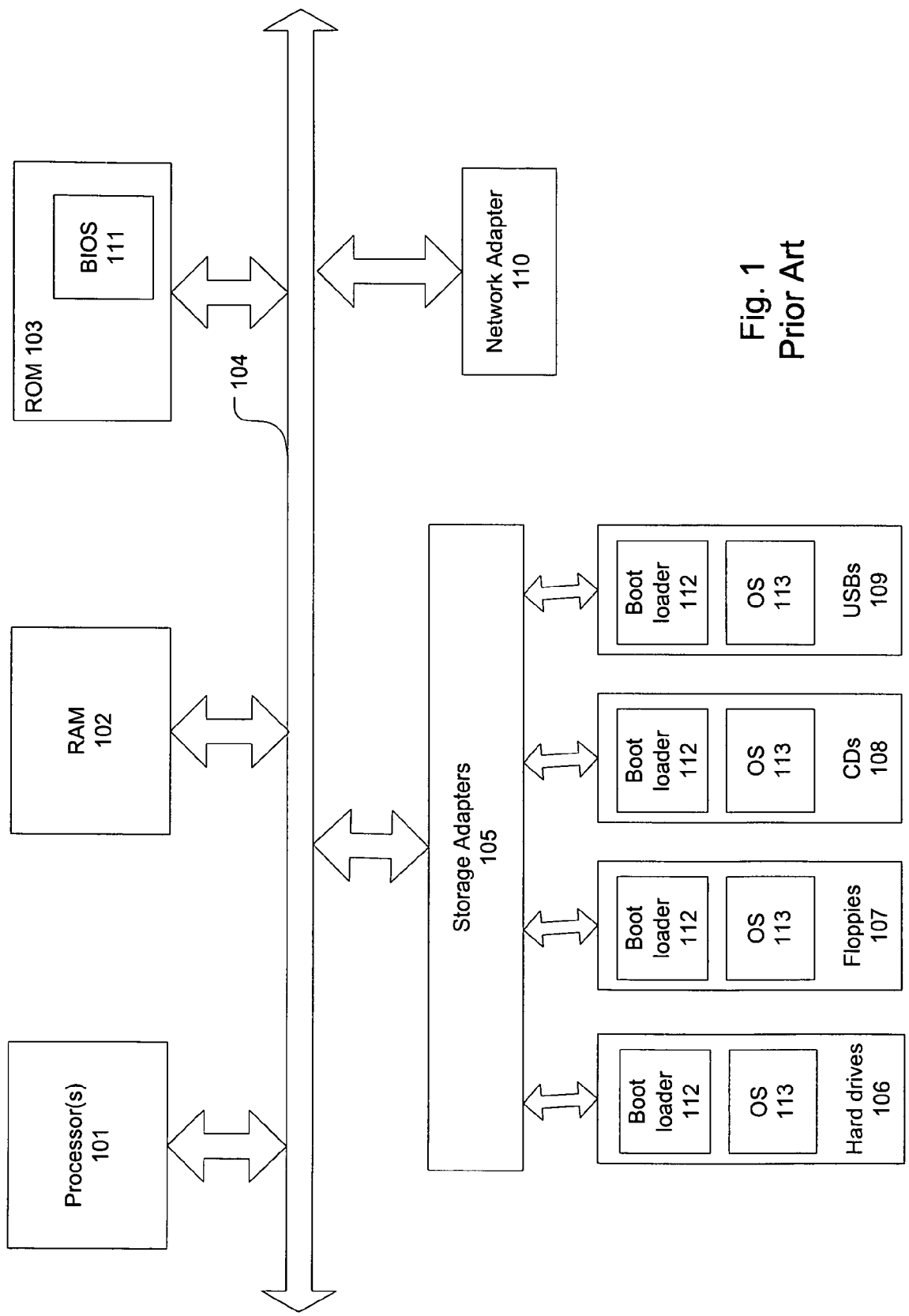
FIG. 1 illustrates a prior art IBM PC compatible processing system.
Figure 2:
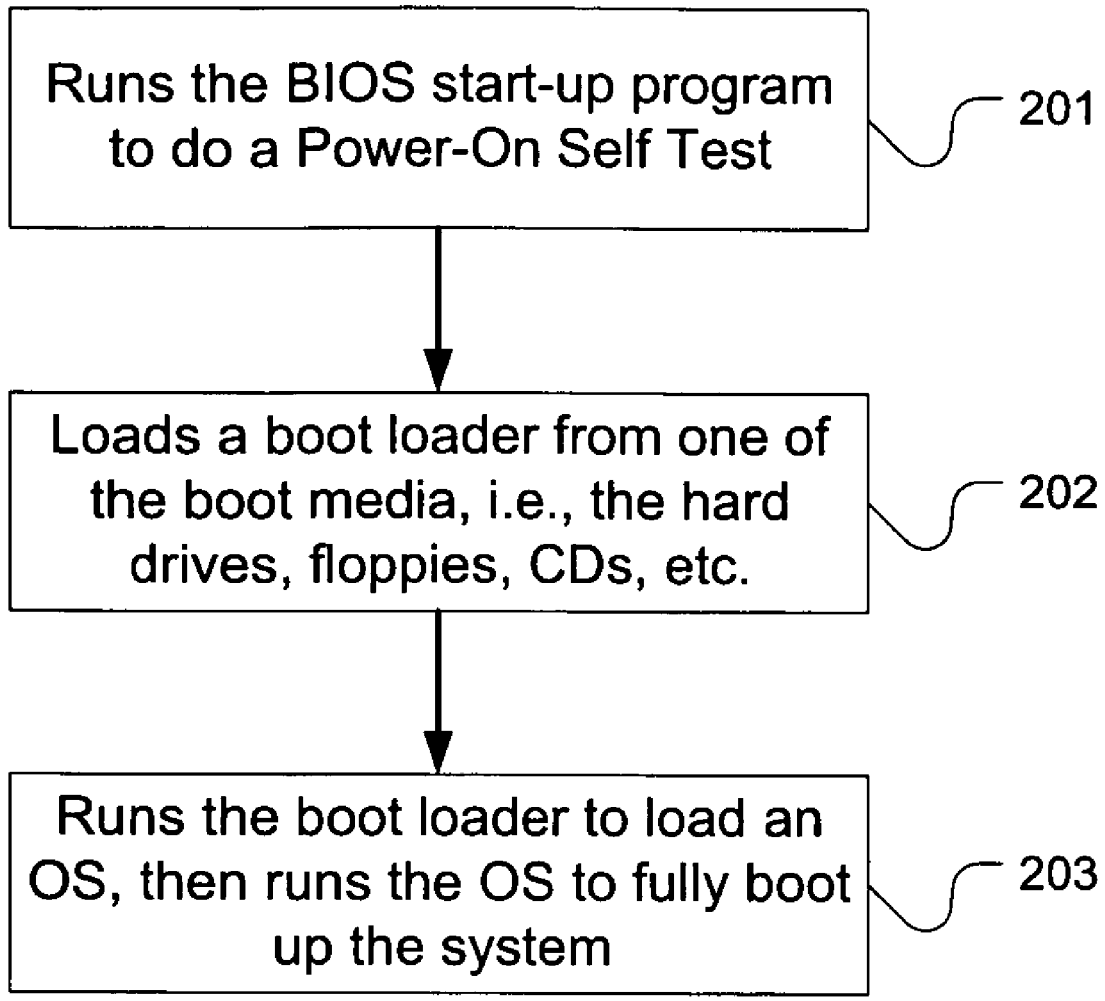
FIG. 2 is a flow diagram illustrating a traditional boot process of the processing system described in FIG. 1.
Figure 3:
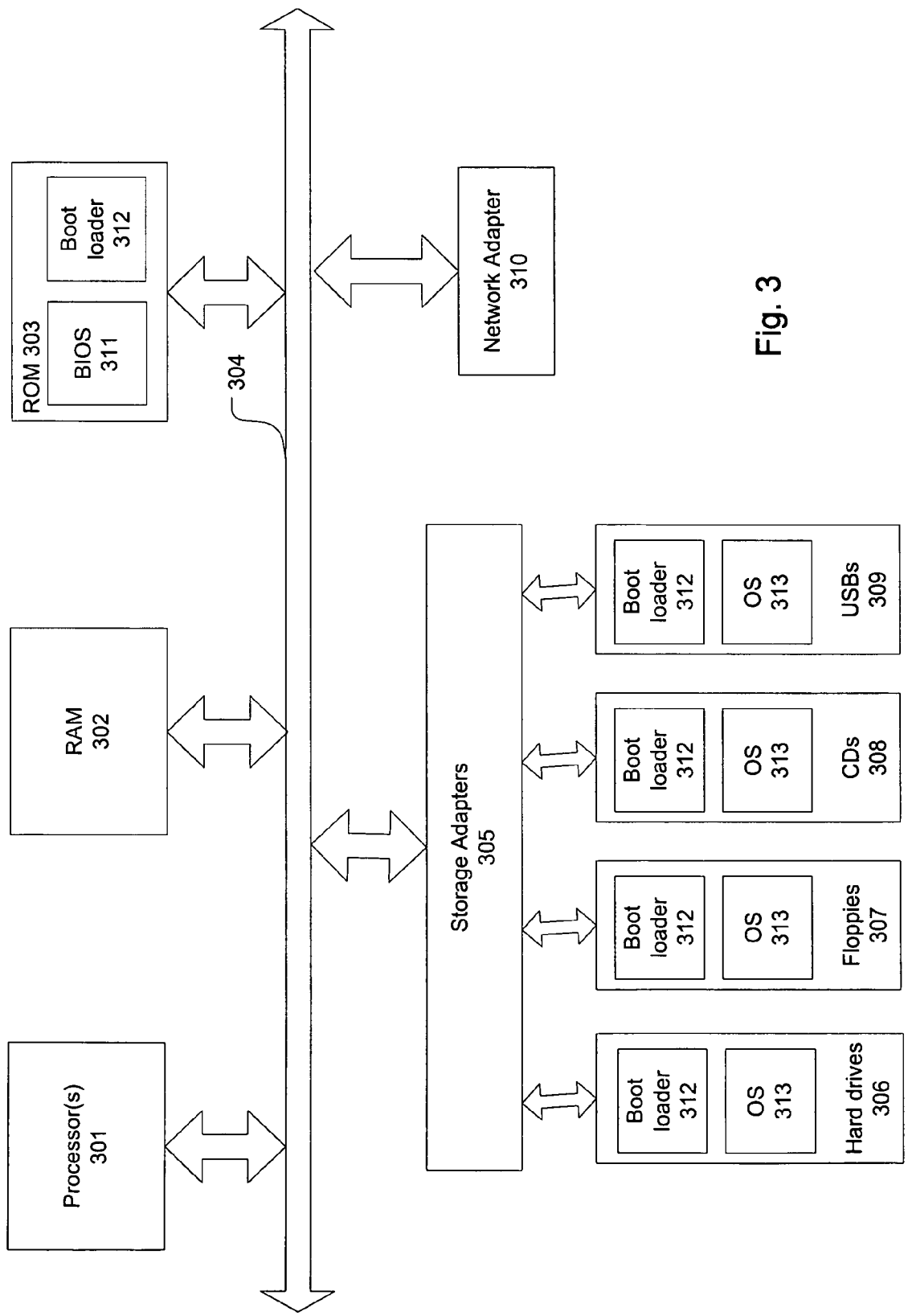
FIG. 3 illustrates a processing system according to an embodiment of the present invention.

FIG. 3 illustrates a processing system according to an embodiment of the present invention. According to the depiction of FIG. 3, the processing system in FIG. 3 is similar to a traditional IBM PC compatible processing system, such as the one shown in FIG. 1, but with important differences. First, a ROM 303 stores not only a BIOS 311 but also a boot loader 312, which may be used to load an OS for booting up the processing system. Second, the boot loader 312 includes a header, which provides an interface to the BIOS 311. This interface facilitates the transfer of control from the BIOS 311 to the boot loader 312 more efficiently. In addition, the BIOS 311 is designed to allow an administrator of the processing system to choose which boot loader to be used during the boot process, the one stored in the ROM 303 or any boot loader stored on any of the boot media, i.e., the hard drives 306, floppy disks 307, CDs 308, USB flash memories 309, etc. If the administrator chooses to use one of the boot loaders stored on the boot media, the processing system will boot up according to the traditional approach such as described in FIG. 2. Otherwise, the processing system will boot up according to the approach introduced therein. A person of ordinary skill in the art will appreciate that any kind of user with privilege to monitor or control the booting process of the processing system may choose which boot loader to be used in the above embodiment. In addition, a user's intervention may not be necessary at all. The BIOS 311 may follow a pre-configured sequence in choosing which boot loader to be used during a boot process.

In an alternative embodiment, the boot loader 312 may be stored in a separate ROM other than ROM 303. Moreover, although not shown in FIG. 3, in order to improve the reliability, a second set of BIOS and/or boot loader may also be provided and stored in the ROM 303. In case the first set of BIOS 311 and/or boot loader 312 in the ROM 303 become corrupted, the system may revert to use the second set of BIOS and/or boot loader to boot the system to avoid the interruption of services.

Figure 4:
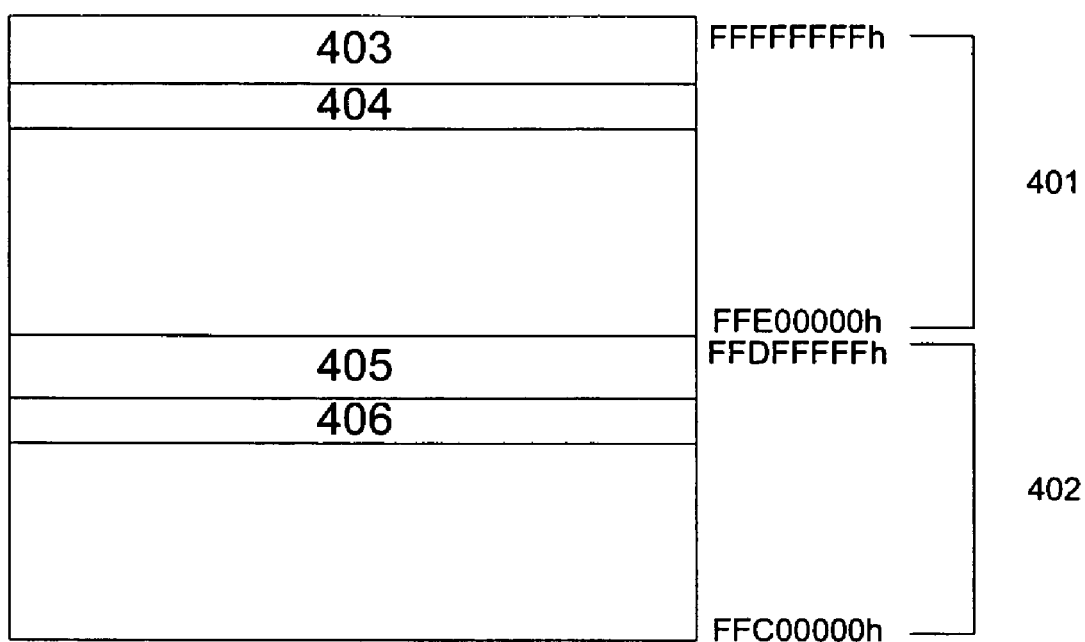
FIG. 4 is a block diagram showing an exemplary layout of the ROM 303 of FIG. 3.

FIG. 4 is an exemplary block diagram showing a layout of the ROM 303 of FIG. 3, and how the BIOSs and boot loaders are stored. As shown in FIG. 4, the ROM 303 may be divided into a first section 401 and a second section 402. The first section 401 may start from address FFE00000h and end at address FFFFFFFFh. The first section 401 stores a first BIOS 403 and a first boot loader 404. The second section 402 may start from address FFC0000h and end at addresses FFD-FFFFFh. The second section 402 stores a second BIOS 405 and a second boot loader 406. A person of ordinary skill in the art will realize that the starting/ending addresses used herein are just for illustration purposes, not for restriction purposes. In addition, FIG. 4 is an illustrative layout of storing the BIOSs and boot loaders. A person of ordinary skill in the art will also realize that the BIOSs and boot loaders may be stored in a different layout in the ROM.

The following is an example of a data structure of the header at the beginning of each boot loader image (402 and 404) shown in FIG. 4.

header {
   signature;
   load_addr;
   entry_point;
   prolog_size;
   loader_xsum;
   header_xsum;
}

As shown above, the field "signature" contains a block of data with a predefined value used for identifying the boot loader in the ROM. A checksum may be calculated for the header. The calculated checksum is then compared with the value of the field "header_xsum" to determine whether the header is valid (not corrupted, for example). Similarly, the field "loader_xsum" is used as the checksum for the whole boot loader image. One example of checksum calculation is the Cyclic Redundancy Check (CRC), a type of hash function used to produce a checksum against a block of data. The field "entry_point" contains the starting addresses of the Prologue portion of the boot loader. The field "prolog_size" defines the size of the Prologue portion of the boot loader. The field "load_addr" defines the starting address in the RAM 302, where the Prologue portion of the boot loader is loaded. The Prologue portion includes stage 1 and stage 2 of the boot loader. In one embodiment, the boot loader in the ROM only includes the Prologue portion (stage 1 and stage 2) and the loader. The MBR stage is not necessary as the boot loader is now stored in the ROM.

Again, the above data structure is just one way of implementing the present invention. It is given for illustration purposes, not for restriction purposes, as the present invention may be implemented in many different ways in accordance with the principles of the present invention.

Figure 5:
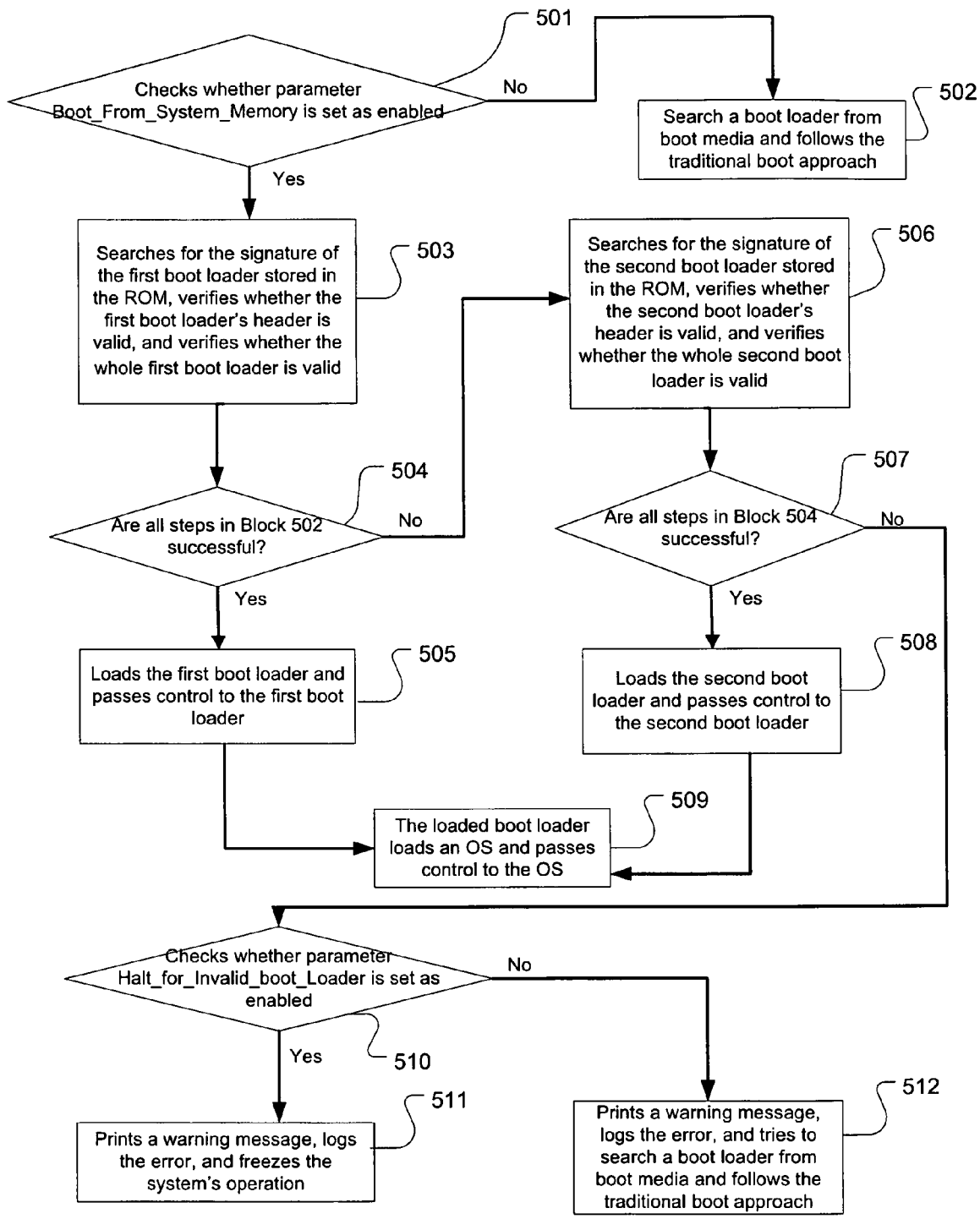
FIG. 5 is a flow diagram illustrating a boot process of the processing system depicted in FIGS. 3 and 4 according to an embodiment of the present invention.

FIG. 5 is a flow diagram illustrating a boot process of the processing system depicted in FIGS. 3 and 4 according to an embodiment of the present invention. Two setup options are implemented in the BIOS (whether it is the first BIOS or the second BIOS) as control parameters: (1) Boot_From_System_Memory (enabled/disabled, default: enabled), and (2) Half_for_Invalid_Boot_Loader (enabled/disabled, default: enabled). It is assumed that at least one of the BIOSs is not corrupted. At block 501, the BIOS checks whether parameter Boot_From_System_Memory is set as enabled. If the parameter is not set as enabled, the flow goes to block 502, where the processing system will follow the traditional boot approach described in FIG. 2. If the parameter is set as enabled, the flow goes to block 503, where the BIOS searches for the signature of the first boot loader stored in the ROM, verifies whether the first boot loader's header is valid (via checksum validation, for example), and verifies whether the whole first boot loader is valid (via checksum again, for example). In one embodiment, the first boot loader's signature is different from the second boot loader's signature such that a BIOS may distinguish which boot loader is the first one and which is the second one. In another embodiment, a BIOS may distinguish the two boot loaders by the location of the boot loader. If the boot loader is stored in the first section 401 of the ROM 303, then the boot loader is the first one. Otherwise, the boot loader is the second one.

If all of the steps in block 503 are successful (determined at block 504), the BIOS loads the first boot loader into the RAM 302 and passes control to the first boot loader at block 506. At block 509, the loaded boot loader loads an OS from an external storage medium, such as a hard drive, and passes control to the OS. Here, the phrase "pass control to the OS" means starting executing the instructions of the OS. If any error occurs during the steps in block 503, the BIOS (at block 506) searches for the signature of the second boot loader stored in the ROM and does the same steps in block 503. If the second boot loader passes the above steps successfully (determined at block 507), the BIOS loads the second boot loader and passes control to the second boot loader at block 508. The flow then goes to 509, where the loaded boot loader loads an OS and passes control to it. If both the first and second boot loaders fail to pass the above checking steps (because of data corruption, for example), the flow goes to block 510. At block 510, the BIOS checks whether parameter Halt_for_Invalid_Boot_Loader is set as enabled. If so, at block 511, a warning message such as "No Valid Boot Loader in System Flash Memory—Fatal" will be output to a user of the processing system, an event corresponding to the warning message will be logged, and a message "System Halted" will be output to the user, and system operation will be frozen. If the parameter Halt_for_Invalid_Boot_Loader is not set as enabled, then the flow goes to block 512, where a warning message such as "No Valid Boot Loader in System Flash Memory—Fatal" will be output to a user of the processing system, an event corresponding to the warning message will be logged, and the BIOS will try to boot from a boot medium, such as a hard drive.

In another embodiment, as a result of upgrading the first BIOS and the first boot loader, the newly upgraded first BIOS may not be compatible with the second boot loader. Thus, at block 504, if any error occurs during the steps in block 503, the control flow goes directly to block 510, rather than trying to load the second boot loader by going through steps in blocks 506-508. It will be appreciated that the terms "first" and "second" in the present application are used to distinguish the BIOSs and the boot loaders. The terms are used for illustration purposes, not restriction purposes.

Figure 6:
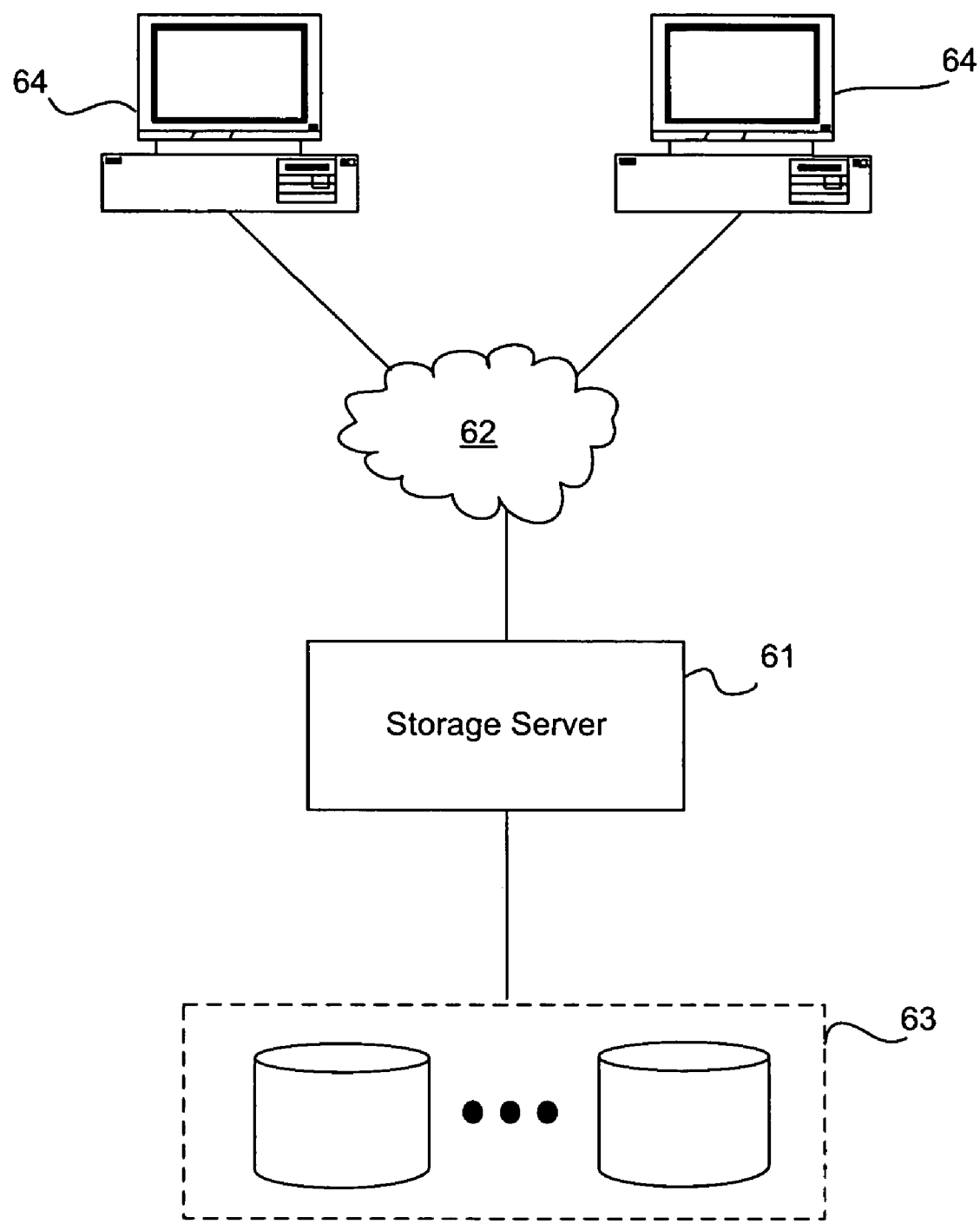
FIG. 6 illustrates a network environment in which the present invention may be implemented.

FIG. 6 illustrates a network environment in which the present invention may be implemented. A storage server 61 is coupled to a storage subsystem 63, which includes multiple mass storage devices (e.g., disks). The storage server 61 may be a processing system incorporating the present invention as described above. The storage server 61 is also coupled through a network 62 to a number of storage clients 64 (hereinafter simply "clients"). The storage subsystem 63 is managed by the storage server 61. The storage server 61 receives and responds to various read and write requests from the clients 64, relating to volumes, Logical Unit Numbers (LUNs), files, and/or other units of data stored in (or to be stored in) the storage subsystem 63.

Each of the clients 64 may be, for example, a conventional personal computer (PC), workstation, or the like. Each client may also be an IBM PC compatible processing system incorporating the present invention as introduced above. The storage server 61 may be, for example, a file server used in a NAS mode (a "filer"), a block-based storage server such as used in a storage area network (SAN), a storage server which can perform both file-level access and block-level access for clients, or another type of storage server. The network 62 may be, for example, a local area network (LAN), a metropolitan area network (MAN), a wide area network (WAN), a global area network (GAN) such as the Internet, or other type of network or combination of networks. The network 62 may implement, for example, Ethernet protocol, Fibre Channel protocol, or another protocol or a combination for protocols.

The storage subsystem 63 may store data represented in a file system of the storage server 61. The mass storage devices in the storage subsystem 63 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 63 can be organized as one or more RAID groups, in which case the storage server 61 accesses the storage subsystem 63 using an appropriate RAID protocol.

The present invention takes advantage of the higher reliability and availability provided by the system flash memory. Further, it provides changes in the BIOS boot process to load the boot loader from system flash memory, without relying on boot media. With this new process, the boot loader can be loaded even when the boot media is corrupt, defective or un-initialized.

Thus, a system having a boot loader installed as system firmware has been described.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A processing system comprising:
a processor;
a memory coupled to the processor;
a Read-Only Memory (ROM) directly accessible by the processor such that the processor does not have to communicate through any Input/Output control devices to access the ROM, the ROM storing a first and second set of booting instructions for booting an Operating System (OS); and
a first Basic Input/Output System (BIOS) to
determining a set of booting instructions to execute, wherein the determining verifies the first set of booting instructions and verifies the second set of booting instructions if the verifying of the first set of booting instructions is unsuccessful, and
load a successfully verified set of bonding instructions into the memory for execution by the processor, wherein the successfully verified set of booting instructions, when executed by the processor, loads the OS into the memory.

2. The processing system of claim 1, wherein the first BIOS is stored in the ROM.

3. The processing system of claim 2, wherein the ROM stores a second BIOS as a failover backup for the first BIOS.

4. The processing system of claim 1, wherein the first set of booting instructions comprises a first boot loader.

5. The processing system of claim 1, further comprising an Input/Output control device which comprises a disk controller to allow the processor to communicated with the peripheral storage device.

6. The processing system of claim 1, wherein the first BIOS, when executed by the processor, may be instructed to load a set of booting instructions from a storage device, not the successfully verified set of booting instructions from the ROM, for booting the OS, the processor communicating with the storage device through an Input/Output control device.

7. The processing system of claim 1, wherein the first BIOS loads a set of booting instructions from a storage device for booting the OS if the BIOS fails to load the successfully verified set of booting instructions from the ROM, and wherein the processor is to communicate with the storage device through an Input/Output control device.

8. The processing system of claim 1, wherein the first BIOS, when executed by the processor, loads the successfully verified set of booting instructions from the ROM by
searching for a signature in the ROM, the signature identifying the successfully verified set of booting instructions;
checking data integrity of the successfully verified set of booting instructions;
loading the successfully verified set of bonding instructions into the memory; and
triggering execution of the successfully verified set of booting instructions by the first processor.

9. The processing of claim 1, wherein verifying the first boot loader comprises:
searching for the signature of the first boot loader;
verifying a header of the first boot loader;
upon successful verification of the header of the first boot loader, verifying the first boot loader.

10. The processing system of claim 9, wherein verifying the second boot loader comprises:
upon unsuccessful verification of the header of the first boot loader or upon unsuccessful verification of the first boot loader,
searching for the signature of the second boot loader,
verifying a header of the second boot loader, and
upon successful verification of the header of the second boot loader, verifying the second boot loader.

11. The processing system of claim 10 further comprising:
upon unsuccessful verification of the header of the second boot loader or upon unsuccessful verification of the second boot loader;
determining whether a halt parameter is enabled;
upon determining that the parameter enabled, halting operation of the processing system; and
upon determining that the parameter is not enabled, loading a boot loader from a boot medium.

12. A method comprising:
loading a first Basic Input/Output System (BIOS) into a memory in a processing system for execution by a processor in the processing system;
determining a boot loader to execute, wherein the determining verifies a first boot loader, and verifies a second boot loader if the verifying of the first boot loader is unsuccessful;
as a result of the execution of said first BIOS, loading a successfully verified boot loader into the memory, from a Read-only Memory (ROM) directly accessible by the processor, such that the processor does not have to communicate through any Input/Output control device to access the ROM, wherein the successfully verified boot loader, when executed by the processor, loads an Operating System (OS) in to the memory.

13. The method of claim 12, wherein the first BIOS is stored in the ROM.

14. The method of claim 13, wherein the ROM stores a second BIOS as a failover backup for the first BIOS.

15. The method of claim 12, wherein the first boot loader comprises a set of booting instructions for booting the OS.

16. The method of claim 12, wherein the Input/Output control device comprises a disk controller to allow the processor to communicate with a peripheral storage device.

17. The method of claim 12, wherein the BIOS, when executed by the processor, may be instructed to load a boot loader from a storage device, not the successfully verified boot loader from the ROM, for booting the OS, the processor communicating with the storage device through the Input/Output control device.

18. The method of claim 12, wherein the BIOS loads a boot loader from a storage device for booting the OS if the BIOS fails to load the successfully verified boot loader from the ROM, the processor communicating with the storage device through the Input/Output control device.

19. The method of claim 12, wherein the BIOS, when executable by the processor, loads the successfully verified boot loader from the ROM by
searching for a signature in the ROM, the signature identifying the successfully verified boot loader;
checking data integrity of the successfully verified boot loader;
loader the successfully verified boot loader into the mail memory; and
triggering execution of successfully first boot loader by the processor.

20. A processing system comprising:
a processor;
a memory coupled to the processor;
a first and second boot loader stored in a Read-Only Memory (ROM) of the processing system as firmware, the ROM being directly accessible by the processor such that the processor does not have to communicated through any Input/Output control device to access the ROM; and
a first Basic Input/Output System (BIOS) having instructions to be loaded into the memory for execution by the processor, the BIOS to
determine a boot loader to execute, wherein the determination verifies the first boot loader, and verifies the second boot loader if the verifying of the first boot loader is unsuccessful, and
load a successfully verified boot loader into the memory through an interface provided by a header of the successfully verified boot loader, wherein the successfully verified boot loader, when executed by the processor, loads an Operating System (OS) into the memory.

21. The processing system of claim 20, wherein the BIOS, when executed by the processor, loads a boot loader from a storage device for booting the OS if the BIOS fails to load the successfully verified boot loader from the ROM, the processor communicating with the storage device through an Input/Output control device.

22. The processing system of claim 20, wherein the BIOS, when executed by the processor, loads the successfully verified boot loader from the ROM by
  searching for a signature in the ROM, the signature identifying the successfully verified boot loader;
  checking data integrity of the successfully verified boot loader;
  loading the successfully verified boot loader into the memory; and
  triggering the execution of the successfully verified boot loader by the processor.

* * * * *